(No Model.)
M. M. BURCHFIELD.
STEAM FRUIT DRIER.
No. 323,781. Patented Aug. 4, 1885.
Fig.1.
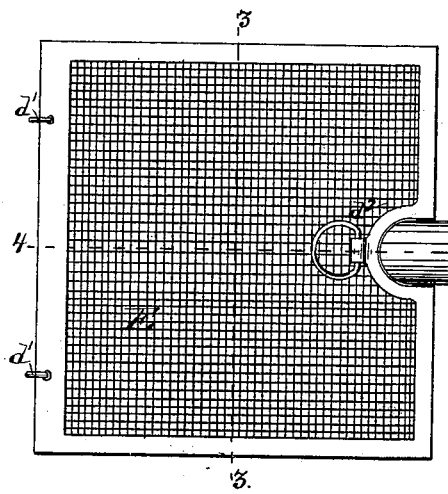
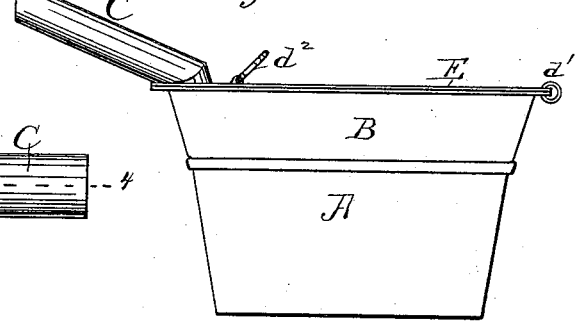
Fig.2.
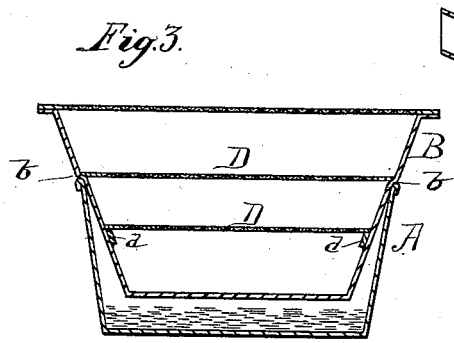
Fig.3.
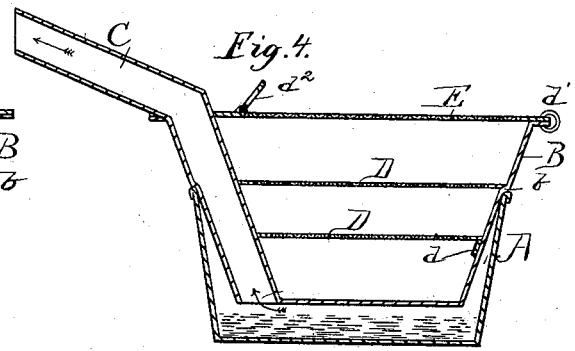
Fig.4.
Witnesses:
J. Everett Brown
Lew. E. Curtis
Inventor:
Mary M. Burchfield,
per Munday Evarts & Adcock
her Attorneys:
N. PETERS. Photo-Lithographer. Washington. D. C.

UNITED STATES PATENT OFFICE.

MARY M. BURCHFIELD, OF KINGSTON, ILLINOIS.

STEAM FRUIT-DRIER.

SPECIFICATION forming part of Letters Patent No. 323,781, dated August 4, 1885.

Application filed November 24, 1884. (No model.)

*To all whom it may concern:*

Be it known that I, MARY M. BURCHFIELD, a citizen of the United States, residing in Kingston, in the county of De Kalb and State of Illinois, have invented a new and useful Improvement in Steam Fruit-Driers, of which the following is a specification.

The object of my invention is to provide a cheap and simple device that may be used upon the common cook stove or range for the purpose of drying fruits and vegetables; and to this end my invention consists of an outer pan or vessel adapted to hold water for generating steam, and another pan or vessel to contain the fruit or articles to be dried, setting inside the water-vessel, so that the steam from the water can envelop it and thus heat and dry the fruit, and a pipe or tube for conveying away the steam to prevent its condensing upon the contents of the inner vessel. The inner pan or vessel is provided with an open or wire-cloth cover to permit evaporation from the substance being dried and to protect the same from dirt, &c. It may be provided with suitable shelving, so that the articles to be dried may be exposed in thin layers, and the steam pipe or tube for conducting away the steam from the water may preferably be attached to the inner pan and bent to serve also as a handle. By reason of the water and steam in the outer vessel heat will be properly communicated to the contents of the inner vessel, and the water will prevent all danger of burning or injuring the fruit or article being dried, so that my drier may be left on the stove at all times, and will require little or no attention and care.

By means of my invention, constituting as it does a simple utensil for the cook stove or range, families can at very little or no expense dry very rapidly their own fruits and vegetables.

An ordinary dripping-pan to fit a No. 8 or 9 or other stove may of course be used for the outer or water vessel, and the inner pan made of sizes to fit.

In the accompanying drawings, which form a part of this specification, and in which similar letters of reference indicate like parts, Figure 1 is a plan view of a device embodying my invention. Fig. 2 is a side elevation, and Figs. 3 and 4 are cross-sections on lines 3 3 and 4 4 of Fig. 1.

In the drawings, A represents the outer or water vessel or pan; B, the inner vessel or fruit-receptacle. The inner vessel, B, is provided with offsets or shoulders $b$, to adapt it to set down upon the outer vessel, A.

C represents a bent pipe or tube securely attached to the inner vessel, B, and with its mouth opening into the outer vessel for the purpose of conducting away the steam arising from the water and preventing its condensation upon the contents of the inner vessel, B.

The fruit-vessel B may preferably be provided with one or more wire-gauze shelves, D, so that the material to be dried may be spread out into thin layers. The shelves D should be made removable, and may rest upon beads or shoulders $d$ on the interior of the fruit-vessel B.

E represents a cover or lid for the inner vessel. It is made of wire-cloth, so as to permit of evaporation through it, and at the same time protect the contents of the drier from dirt and dust. The cover is hinged to the top of the drying-vessel B at one side. $d'$ indicates the hinges, and $d^2$ is a ring or handle for lifting the cover. By securing the bent pipe C to the drying-vessel B it serves also as a handle for lifting it.

In operation the water in the outer vessel should not fill it deep enough to close the mouth of the pipe C, as that would prevent the escape of the steam.

I hereby disclaim, as forming no part of my invention, the cooking apparatuses or utensils shown in the Patents No. 198,316 to Smith, No. 164,964 to Brown, and No. 308,004 to Stears. In each of said devices not only the outer but the inner vessel is constructed and adapted to partially confine the steam therein and operates to cook the contents of the vessel. My invention is an improved fruit-drier, and my inner vessel is provided with a perforated cover to permit the free escape of steam or moisture therefrom, while the hollow handle of the inner vessel serves to prevent the escaping steam from the outer vessel from enveloping the drying contents of the inner vessel.

I am of course aware that steam-driers have heretofore been made, and I do not claim the same broadly; but What I do claim is—

1. The combination of the outer water-pan, A, inner drying-vessel, B, having a hinged perforated cover, E, provided with shoulders b, and bent steam-pipe C, secured to said inner vessel to serve as a handle for the same, said steam-pipe opening into the space between said inner and outer vessels, substantially as specified.

2. The combination of water-pan A, drying-pan B, provided with shoulder b, and perforated cover E, with the steam-escape C and perforated shelves D, to permit the vapor from the lower apartments to pass freely through said shelves, substantially as specified.

MARY M. BURCHFIELD.

Witnesses:
H. R. FULLER,
GRACE A. HARMES.